(12) United States Patent
Kanevsky et al.

(10) Patent No.: US 7,515,136 B1
(45) Date of Patent: Apr. 7, 2009

(54) COLLABORATIVE AND SITUATIONALLY AWARE ACTIVE BILLBOARDS

(75) Inventors: Dimitri Kanevsky, Ossining, NY (US); Bhuvana Ramabhadran, Mount Kisco, NY (US); Roberto Sicconi, Ridgefield, CT (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/183,651

(22) Filed: Jul. 31, 2008

(51) Int. Cl.
*G09G 5/00* (2006.01)
*G06Q 30/00* (2006.01)
*G06F 3/00* (2006.01)

(52) U.S. Cl. .......................... 345/156; 705/14; 725/42; 40/624; 463/42

(58) Field of Classification Search ................. 345/156, 345/1.1, 1.2, 1.3, 2.1, 2.2, 2.3
See application file for complete search history.

(56) References Cited

U.S. PATENT DOCUMENTS

| 5,612,741 | A | 3/1997 | Loban et al. | |
|---|---|---|---|---|
| 5,848,129 | A | 12/1998 | Baker | |
| 6,421,453 | B1 | 7/2002 | Kanevsky et al. | |
| 6,505,348 | B1 | 1/2003 | Knowles et al. | |
| 7,051,354 | B2 | 5/2006 | Mears | |
| 7,208,669 | B2 * | 4/2007 | Wells et al. | 84/601 |
| 7,242,389 | B1 | 7/2007 | Stern | |
| 7,259,747 | B2 | 8/2007 | Bell | |
| 2005/0021393 | A1 | 1/2005 | Bao et al. | |
| 2005/0234768 | A1 * | 10/2005 | Wald et al. | 705/14 |
| 2006/0105841 | A1 * | 5/2006 | Rom et al. | 463/42 |

(Continued)

FOREIGN PATENT DOCUMENTS

WO 2002/29665 4/2002

OTHER PUBLICATIONS

Holleis, et al., "Keystroke-Level Model for Advanced Mobile Phone Interaction." CHI 2007 Proceedings; Models for Mobile Interaction; Apr. 28; May 3, 2007; San Jose, CA, USA.

(Continued)

*Primary Examiner*—Duc Q. Dinh
(74) *Attorney, Agent, or Firm*—McGinn IP Law Group, PLLC; Carl Lanuti, Esq.

(57) ABSTRACT

A method of collaborative interactions with billboards includes receiving a request, by a billboard network manager, from an advertisement company to display synchronized interactive advertisements and video games on billboards in an area, inviting users in the area to participate in the advertisements and video games through the billboards and mobile devices of the users via a network, checking registration of the users to participate in the collaborative interactions with billboards, and checking a volume of the users in the area for appropriate synchronized advertisements and video games. If the volume of users is appropriate for synchronized advertisements and video games, then the billboard network manager displays the synchronized advertisements and video games, and continues to track the volume of the users in the area. If the volume of users is not appropriate for synchronized advertisements and video games, then the billboard network management reconfigures synchronized billboard content for more appropriate advertisements and video games by one of randomly changing a content, and propagating and extending through synchronized billboards a particular content of some billboard section that brought more interest from the users.

1 Claim, 7 Drawing Sheets

U.S. PATENT DOCUMENTS

2006/0111979 A1* 5/2006 Chu .......................... 705/14
2007/0069973 A1 3/2007 Gerbacia et al.
2007/0136122 A1 6/2007 Diederiks
2007/0257816 A1 11/2007 Lyle et al.
2007/0294096 A1 12/2007 Randall et al.

OTHER PUBLICATIONS

Paek, et al., "Toward Universal Mobile Interaction for Shared Displays." CHI Letters; 2007, vol. 6, Issue 3, pp. 266-269.

* cited by examiner

COLLABORATIVE AND SITUATIONALLY AWARE ACTIVE BILLBOARDS

BACKGROUND OF THE INVENTION

1. Field of the Invention

The present invention generally relates to a method and system for collaborative interactions with billboards, and more specifically to a method and system for allowing a crowd of cell-phone users to interact with a billboard networked to other billboards in a local area.

2. Description of the Related Art

Billboards and similar hoardings are generally passive and display a mounted picture or pictures for a fixed period of time. Their content is decided by the lessee of the space. Electronic displays have enhanced the billboards to allow remote interaction with a particular hoarding for modifying a message. Some billboards, including one launched in Times Square in 2004, allow mobile cell phone users to register by calling the displayed phone number on the hoarding and participate in a mock "auto race" on screen. However, such a billboard was rigged to take a single input interface.

Conventional billboards do not allow participation of a high volume of users from a variety of mobile devices. For example, the billboard system disclosed in U.S. Pat. No. 7,242,389 is designed for use in a defined location with a single input device. Therefore users from various locations (e.g., different parts of a city) with different mobile devices (e.g., cell phone, MP3 player, or PDA) cannot participate in an interactive display. Likewise, the method described in U.S. Pat. No. 5,848,129 does not allow a user to control images or interact with a visual display. The user can only input information. Furthermore, a group of users cannot interact among each other using the display. Similarly, the billboard system disclosed in U.S. Pat. No. 7,259,747 allows multiple users to interact with a large display, but the users cannot participate from a remote location. Indeed, the users have limited control over the display and cannot use their mobile devices to interact with the display.

SUMMARY OF THE INVENTION

A need exists to enhance billboard systems for collaborative, concurrent interaction with passers-by, to play complex games, track, and continue interaction with the users on the move and over time. In view of the foregoing and other exemplary problems, drawbacks, and disadvantages of the conventional methods and structures, an exemplary feature of the present invention is to provide a method for collaborative interactions with billboards.

An exemplary embodiment of the present invention includes a method for allowing a crowd of cell-phone users to interact with a billboard networked to other billboards in a local area. A crowd of cell-phone users interact, via their cell-phones, with an interactive billboard (e.g., one displaying a game.) The crowd votes for an action they want the interactive billboard to perform (e.g., a move in a game.) The interactive billboard performs the action for which a majority of the crowd has voted.

The interactive billboard is connected with other similar billboards in a block-wide or city-wide configuration, allowing a member of cell-phone users to continue to interact with an event (e.g., a game) on the interactive billboard by viewing that event on a subsequent billboard.

In another exemplary embodiment of the present invention, a member of the crowd of cell-phone users registers his/her cell-phone with the billboard so that the interactive billboard, and any subsequent billboards, will recognize his/her phone.

In another exemplary embodiment of the present invention, mobile devices other than cell-phones (e.g., iPods, PDAs) are also used to interact with the interactive billboard.

In yet another exemplary embodiment of the present invention, personal computers, via the Internet, may also be used to interact with the interactive billboard.

In sum, this invention discloses the concept of a situationally aware, collaborative billboard with the following features:

a. Billboards that receive signals from individuals in passing crowds;

b. Members of the audience register voluntarily and can interact with a content on the billboard;

c. Billboard can acknowledge individuals by infra-red isolation, cell-phone interaction, radio frequency identification (RFID) fobs, etc.;

d. Members of the audience can interact with the billboard as in make a move in a game in progress. Passing or gathered crowds may make a move individually or collectively;

e. Game moves may simply be a majority vote collected from members of the passing crowd or audience over a time window;

f. Billboards are connected to other billboards, block-wide, or city-wide so that as an individual moves along, he/she can interact with the billboards. By providing each billboard with a unique identifier, each billboard interacts with other participating billboard conveying its existing state;

g. Billboards can be logically segmented so that different items of interest can be displayed and interacted upon, based on the users' interest. For instance, one logical panel can be a chess game, while another can be a video game, while a third may be a collaborate design of a consumer article;

h. Different billboards across a town are connected allowing for the same interaction to be continued on another while a user is on the move;

i. Individuals and passers-by can vote on what they see, or would like to see on the billboard. Whether the same "item of interest" is shown on connected billboards, or whether the displayed content is independent of the users' interest, depends on the choice of the users. If a user moves from billboard A, where the user was playing chess with another member or members of a audience, to billboard B across the town, then the billboard B will recognize the user's presence and registers the user. At that point the user can continue the chess game. The user can choose to continue the game from where he left off, or where the game has evolved since his last move on billboard A;

j. Collaborative games can also be played with multiple members of a crowd in front of the billboard by taking input from an entire crowd who are concerned within a time window, and then playing a move chosen by the majority of the crowd. For example, fifty people can be involved and each move can have a finite amount of time;

k. This method of collaboration extends to dynamic design concepts as well. Manufacturers seeking consumer input for design can allow passers-by to augment or embellish the design of an item on display. Instant feedback on the display allows for immediate up or down vote on a design feature. This collective design system receives input from multiple sources. For example, if a picture of a car or some other object is displayed with a system randomizing pieces of it, then votes take the design in different directions and a path where the majority of the voters liked would win. The key here is that the randomized selection is offered by the system;

l. The time-elapsed nature of the interaction with active billboards allows interaction with or downloading from billboards from the user's home or a mobile device;

m. Billboards are not available on mapping systems as independent network entities;

n. The players may be spread over multiple locations and across multiple billboards, such as a roving chess game between the billboard and live audiences in front of the billboard. A same game may be displayed via connected billboards across a town to allow large groups of physically separated players to participate in the game;

o. The content displayed on the billboards may be interacted with mobile devices, such as iPods. Hence, interactions with active billboards are possible from remote locations; and p. Interaction with billboards extends to cell-phones, a Scalable Modeling System (SMS), touch-screen mobile devices, mice, etc., by being physically in front of the billboard or over a wireless network, stationary or on the move, interacting with one particular billboard or a plurality of billboards.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
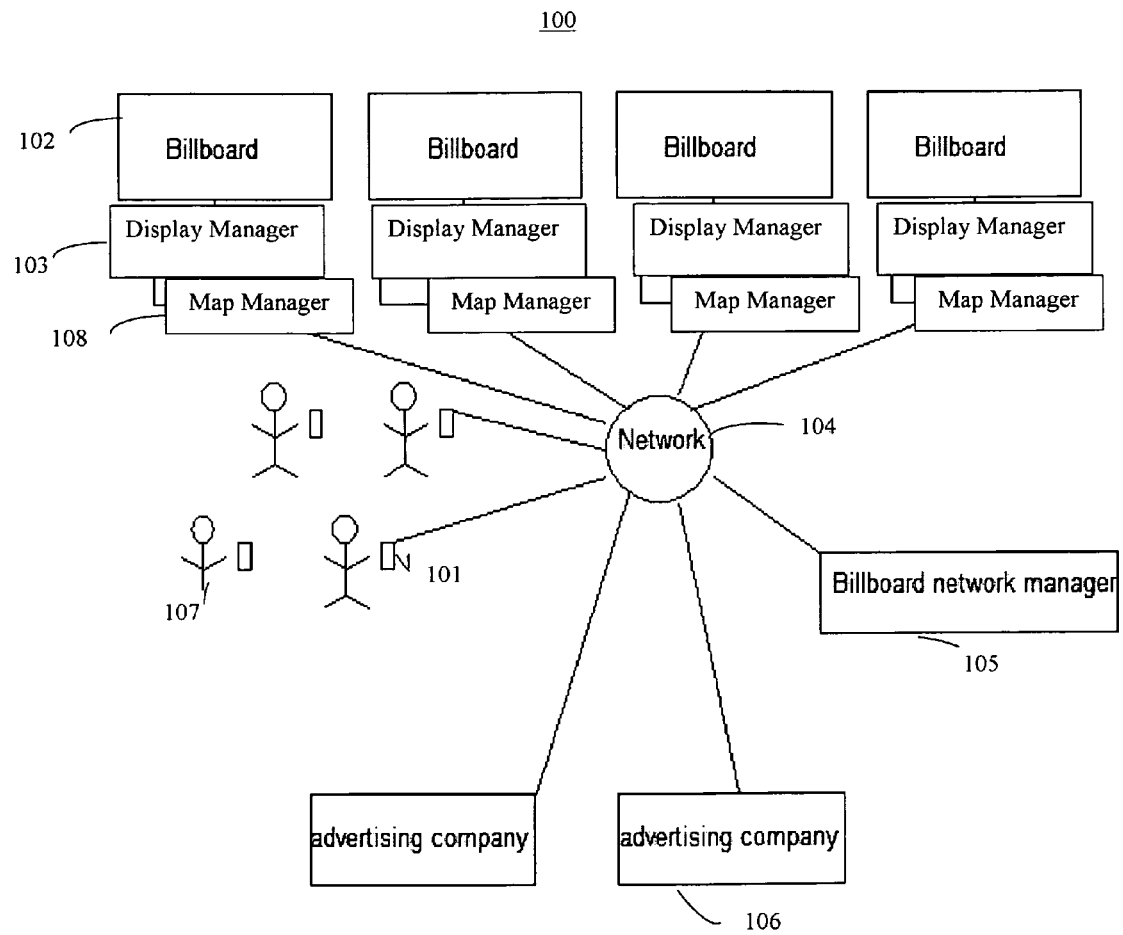
FIG. 1 illustrates an overview of a collaborative aware interaction system 100 for billboards according to an exemplary aspect of the present invention.

Referring now to the drawings, and more particularly to FIGS. 1-7, there are shown exemplary embodiments of the system and method according to the present invention.

FIG. 1 illustrates an exemplary embodiment of an overview of a collaborative aware interaction system 100 for billboards of the present invention. A user 107, who is present in a given location, has a mobile device 101, that he or she can use to interact with other users and billboards 102 via a network 104. The user 107 sees an invitation on the billboard 102 for an interactive feature and sends information via the mobile device through the network 104. Each billboard has a display manager 103 which mediates the data transmitted to and from the billboard. Users 107 send data through the network 104 to the display manager 103 for a specific billboard 102 they wish to interact with. Each billboard 102 receives input from the display manager 103, which has received input from the billboard network manager 105 via a map manager 108. The billboard network manager 105 mediates the display of interactive features over several billboards. The network manager accomplishes tasks related to scheduling and distribution of interactive advertisements over the billboards. Advertising companies 106 contact the billboard network manager 105 via the network 104. These companies can book time and specific interactive advertising features (e.g., games, quizzes, etc.) for their clients.

The user can search for billboard content in maps either from a computer at home/hotel/work or from his/her cellular telephones via the map managers 108 connected to the display manager 103.

In conventional systems, digital maps allow zooming up of any object shown on that map to see it in more detail. Then, if a user is interested in a new object that can be seen inside of the object of interest, the user can put a cursor on the object and zoom it up again. For example, a user may start from a satellite image of a city and zoom up a district in that city. Then, further zooms up a street in this district and a building in that city and even smaller objects located near that building (e.g., cars.) However, current systems do not allow seeing a content of billboards that are located on objects in the map (e.g., billboards on buildings or along a road.)

The system of the present invention allows mapping every billboard 102 to an advertisement/video games database that describes its content. This allows a user to choose a walking route in a city to go through synchronized billboards to see some coherent contents and to participate interactively with billboards. For example, a first item on a first billboard is the Eiffel tower and another item on another billboard is a restaurant located near the Eiffel tower. Another user may choose a route through billboards that advertise historical places in the city.

The following steps describe the concept of mapping in this exemplary embodiment:

1. A user indicates a topic of its interest to see in billboards (e.g., food, dress, cars, video games, chess, starting and end point of his route with some billboard topics etc.);

2. The billboard/map network system displays some locations in maps where billboards relevant to the user's interest are located;

3. The user zooms up a map until the user sees billboards on the map;

4. The user chooses a billboard and requests to display its content;

5. If the user is satisfied with the billboard content, then he requests to be provided with a route through a synchronized system of billboards; and 6. If the user is not satisfied with the content, then he continues the search (e.g., looks for content of other billboards.)

Figure 2:
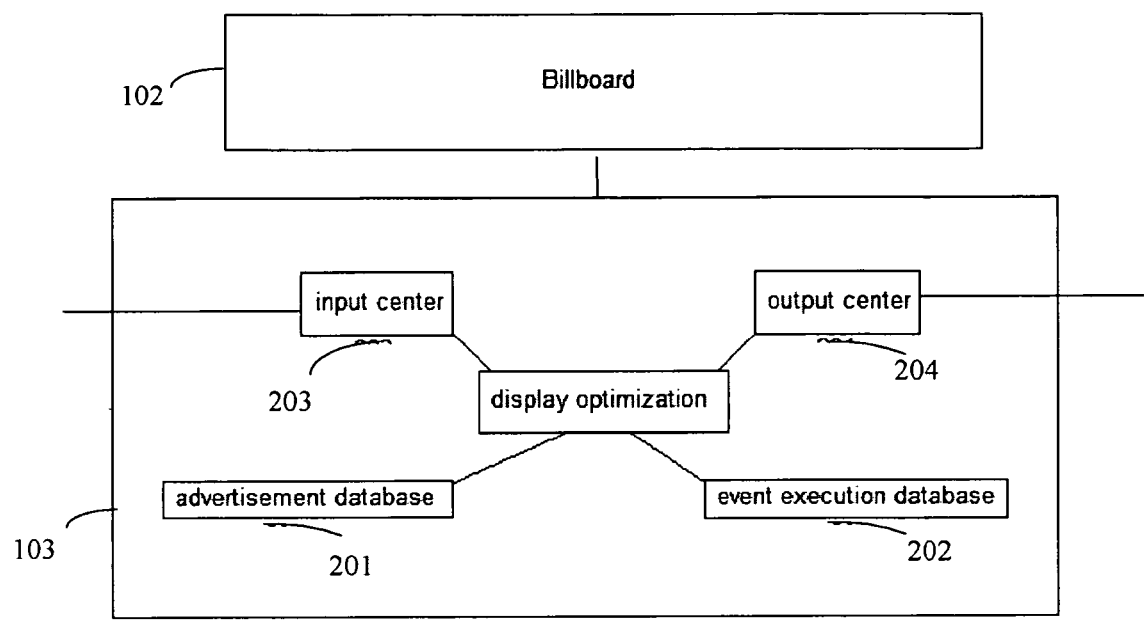
FIG. 2 illustrates a billboard 102 and a display manager system 103 of a collaborative aware interaction system for billboards according to an exemplary aspect of the present invention.

FIG. 2 shows an exemplary billboard 102 and a display manager system 103 of the collaborative aware interaction system for billboards according to the present invention. The display manager 103, which is connected to the billboard 102, is responsible for controlling the visual display of an individual billboard at a given location. The display manager 103 has an input center 203 which receives data from users' mobile devices about the interactive features they would like to execute (e.g., voting, directing, controlling an object on the screen, etc.) The input center 203 also receives data from the billboard network manager 105. The network manager sends information regarding the advertisements and features that should be displayed. This information is stored in the advertisement database 201. The display manager 103 also has an output center from which it sends data to the users and to the billboard network manager. Users will receive data related to their options for interactive feature execution. For example, if they would like to vote in an interactive game, change the color of an object in the display, or write text in the display.

Different users have different voting weight for video/games advertising that represent classes to which they belong. This can be defined by general agreement between members. For example, voting weights for users with higher experience in a game is higher (e.g., chess master may have 100 more weigh that an average user.)

The output center 204 transmits data to the billboard network manager related to user-activity-statistics. This data is used by the billboard network manager to modify advertisements according to a volume of users on a network. The display manager 103 also has an event execution database 202, which contains commands from the billboard network manager related to which advertisements should be displayed, when the advertisements should be displayed, and the advertisements optimal visual format. This information is received and stored in the event execution database 202. Finally, the display manager 103 has a display optimization module, which is responsible for producing the best visual image on the billboard and the users' mobile devices, based on a number of users interacting with the billboard. For example, if 100 users are simultaneously interacting with the billboard, a larger amount of visual space should be available to each user compared to when 1,000 users are interacting with the billboard. The same optimization should be performed for each user's mobile device.

Figure 3:
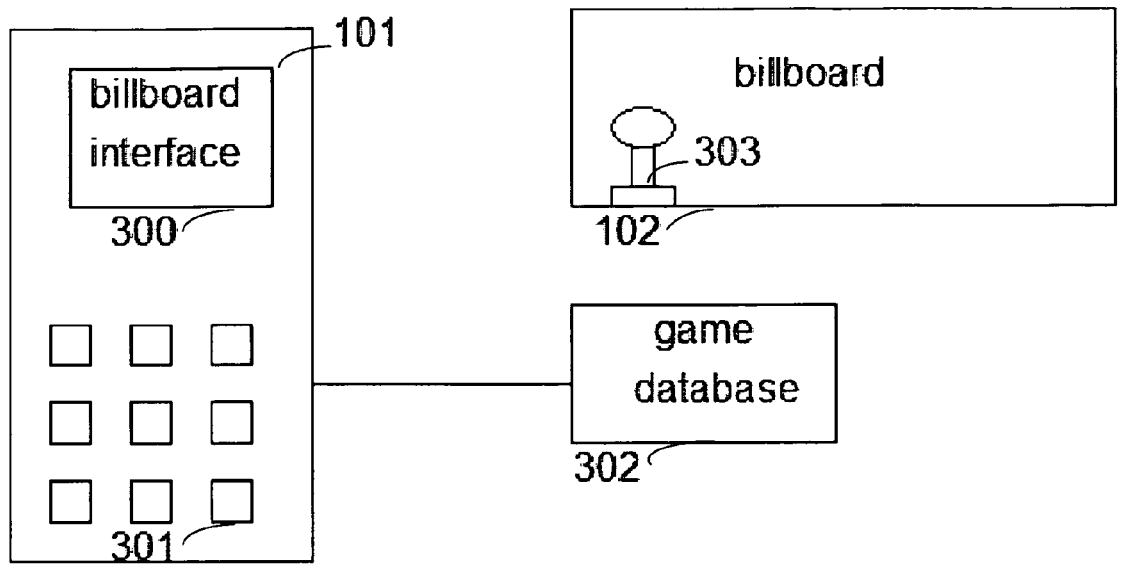
FIG. 3 illustrates content of games module in the mobile device 101 of a collaborative aware active system for billboards according to an exemplary aspect of the present invention.

FIG. 3 depicts content of games module in the mobile device 101 of the collaborative aware active system 100 for billboards according to an exemplary aspect of the present invention, in which users can interact with the billboard 102 via a game interface. Users 107 download games to a game database 302 and can control the game using their keypad 301 through the billboard interface 300. The users must connect to the game database and transmit data to the display manager 103. An example of a game can be playing chess against other users. The user downloads the chess game application from the database 302. The user then makes moves against his or her opponent through his or her mobile device 103. The user controls individual chess pieces, for example, a pawn 303, using the key pad 301.

Figure 4:
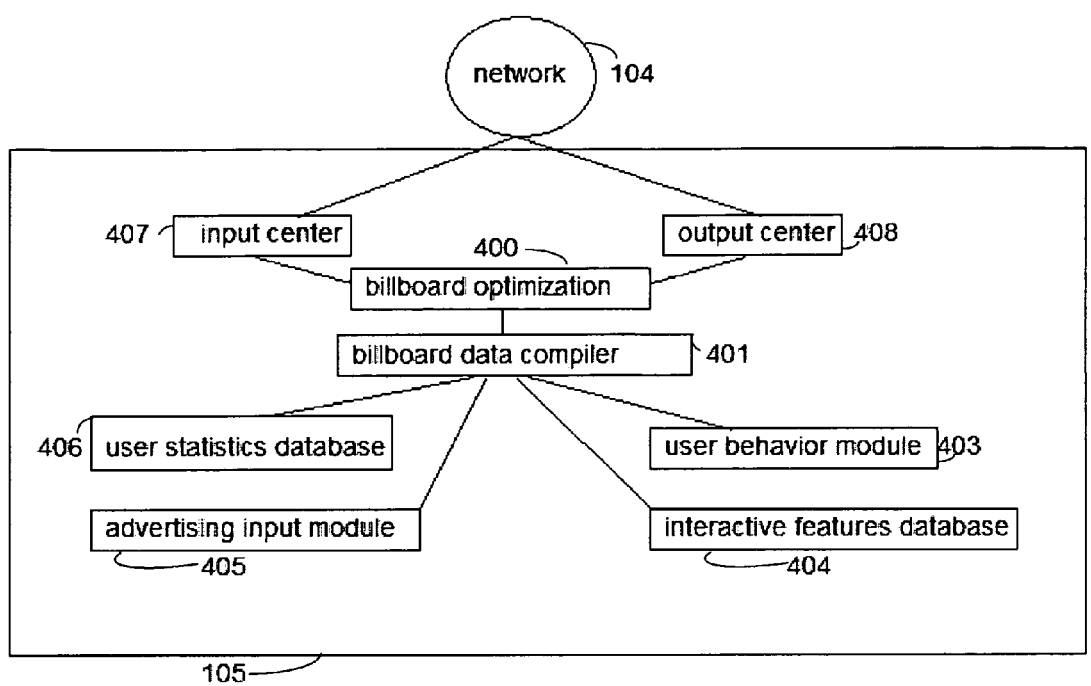
FIG. 4 illustrates a billboard network manager 105 of a collaborative aware interaction system for billboards according to an exemplary aspect of the present invention.

FIG. 4 illustrates an exemplary billboard network manager 105 of the collaborative aware interaction system for billboards according to the present invention. The billboard network manager 105 is the control center of the interactive billboard advertisement system, wherein it mediates requests from advertising companies, schedules display of interactive advertisements, and the format of displays based on a user's activity. The billboard data compiler 401 receives input from the user statistics database 406, the advertising input module 405, the user behavior module 403, and the interactive features database 404. User behavioral biometrics that are suitable for the purposes of identifying their interest to advertisement/games and how they can be detected are applied. The user behavioral biometrics allow detecting the pieces of the advertisement that generates more or less interest and modify the content of the synchronized advertisement accordingly.

The user statistics database 406 receives data from the input center 407 through the network 104, reflecting a number of users participating and are registered on the network. This information is necessary when deciding where to display which advertisements.

If a given billboard location has few users, then an advertisement geared towards fewer users is displayed compared to an interactive advertisement meant for a high volume of users. For example, a low-user-volume advertisement is a chess game where two users can play simultaneously. A high-user-volume advertisement is a car race where many users can participate.

The advertising input module 405 contains data related to advertisements which will be displayed as agreed between advertisement companies and their clients. The interactive features database 404 includes the interactive programs which are displayed on billboards (e.g., games, photos, videos, and audio media.) The user behavior module 403 tracks the movement of users based on their mobile device activity. A collaboration of the user statistics database 406 and the user behavior module 403 allows the billboard network manager 105 to display advertisements in locations where users are most likely exist. The billboard optimization module 400 allocates advertisements in a most efficient manner so that the billboards in a given network display advertisements to a maximum number of users. The output center 408 is where data is sent from to the display managers and advertisement companies through the network.

Figure 5:
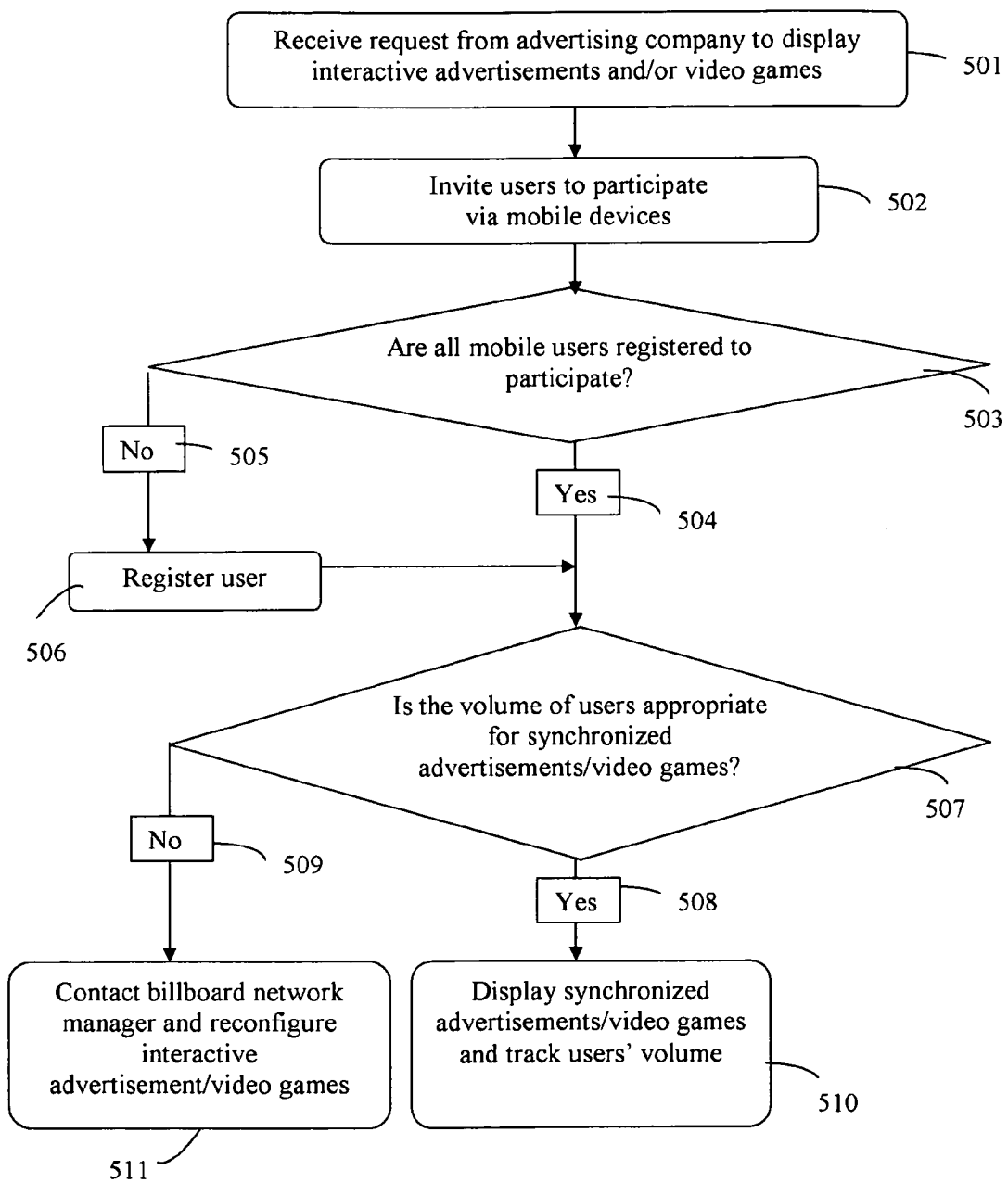
FIG. 5 illustrates a flow chart 500 of a method of collaborative aware interaction of billboards according to an exemplary aspect of the present invention.

FIG. 5 shows a flow chart 500 of a method for a collaborative aware interaction of billboards according to an exemplary aspect of the present invention. In step 501, the billboard network manager receives a request from an advertisement company to display synchronized interactive advertisements and/or video games on a system of billboards in an area. In step 502, users in a given location are invited to participate in the advertisements/video games through the billboards and their mobile devices via a network. In step 503, the billboard network management checks if all the users are registered to participate in the interactive feature.

In step 504, if all the users are registered to participate, then in step 507, the billboard network manager checks if the volume of the users in the area is appropriate for synchronized advertisements/video games in the area. In step 505, if all the users are not registered to participate, in step 506, then the billboard network manager registers the users, and in step 507 checks if the volume of the users in the area is appropriate for synchronized advertisements/video games in the area.

In step 508, if the volume of the users is appropriate, in step 510, then the billboard network manager displays the synchronized advertisements/video games and continues to track the users' volume in the area. In step 509, if the volume of users is not appropriate for the advertisement/video games displayed, in step 511, then the billboard network management reconfigures the network for more appropriate advertisements/video games.

Reconfiguration of advertisements/video games includes either random changes to see if they attract more users or detecting users' biometrics and adjusting the advertisements/games that are relevant to the users' biometrics. Users' biometrics that are suitable for these purposes and the methods that they can be detected are well documented. One can also use information that a piece of advertisement/games brought more attention in a location and propagate this topic through all the synchronized billboards.

This method enables mass interactive advertisement activities via mobile devices. Users near a large visual display can interact with the display and with other users in the area using their mobile devices. The method can be summarized in the following subsections:

1. Registering with Active Billboards

An array of uniquely identifiable (e.g., IP address, name) connected billboards identify a users by RFID proximity, infra-red isolation, cell-phone call to billboard identifier, billboard records on an identifier information database, cell-phone isolation by signal strength and matching against cell-tower db, SMS, etc.

The user pre-registers with a billboard web-site and the billboard recognizes the user once the user is within a range of the billboard. The system uses anonymous access by registering as "wandering user" in the spur of the moment, based on the cell-phone call, SMS, or RFID/infra-red "presence" capability of an end-user device. This would register the user to provide input to the billboard.

2. User Input

Any registered user can interact with the billboard and initialize a new activity on the billboard by selecting list of displayed items. The display items will be visible (on-screen) or virtual (background process), depending on whether billboard is actively processing other inputs or not. Items are displayed on screen or downloaded to a hand-held device (i.e., downloaded menus.) The billboard end-user device communication is over well-established open standards. Interactions with billboards are critical—billboard event handler and scheduler make sure that events are optimally scheduled and conflicting events are ignored (akin to operating system functions.)

3. Billboard Computation of the User Input

The billboard takes input on a first-come first-served basis. If more than one user is registered and the user is specifying a same option, then majority rule is applied. If no majority exists, then the billboard picks option that has a maximum vote. If no maximum exists, then the billboard picks an option with smaller resource footprint (e.g., smaller memory use, background computation versus on-screen, etc.)

Inputs are collected over a default time window and simple majorities are computed before on-screen action is taken. Input arriving outside time window are ignored (e.g., applicable when a game is in progress.) Preference is given to end-users within range of the billboard. Off-screen and offline users are weighted less.

Complex action-oriented games require minimal interaction. For instance, car chases can be interacted with by using mobile phone buttons as a joystick to nudge the car along. The billboard can logically divide a screen into multiple smaller windows. This division is based on the user input. The control of the system is performed by the billboard's computation engine. Only the items for display are selected by the user.

Each smaller window can display a different activity, similar to different "windows" in a computer display. The billboard will optimize screen usage of user interaction activities with paid advertisers.

4. Connected Billboards

Billboards are networked and each billboard is part of a large network topology. The billboard network is a distributed computer with computational power at each node. The users on the move may interact once with billboard A and a few minutes later with Billboard G. If a common game is in progress, then all users participate regardless of their locations.

Each billboard offers a collection of activities (e.g., games, etc.) selectable from a menu. Not all activities are visible on the screen. They may be background processes (i.e., all activities are not required on-screen presence—they may be optimized for a remote user.)

Activities may be shared across the billboards or be resided on only one billboard. The initiation of billboard activities is by a user's choice. Whether an activity is visible or in the "background" is based on the user's choice. Therefore, even if the same activity is running on multiple billboards, it can be in a visible frame (smaller window) on one billboard and in the background on another.

Activities (e.g., games) that stretch across billboards share a common state. Interaction with an activity is determined by the type of interaction the activity is programmed to take. For instance, chess moves can be specified by mobile phone buttons, or slide gestures or by texting the move in chess parlance.

5. Collective Design

A collective, group-oriented, dynamic design can be performed by two methods. In a first method, the billboard activity configures itself based on the algorithm provided by the programmer. Here the design is evolving on the screen as programmed, shapes morph, lines are added, etc. User input is limited to choices of shapes or sizes. By using a joy-stick, a designer can control changes in the colors, lines, space of items on the screen. This gives design owner valuable input about user preferences (e.g., features of a car.)

The second method, which is more traditional, includes placing building blocks that fit together or do not fit together. The billboard is merely a palette for the users to exhibit their creativity. Here a on-screen design is in the control of the end-users. It can provide active input to every phase using a rich set of menus and palettes. The second method is also conducive to off-screen interaction from remote locations. The input provided is always live.

6. Offline and Time-Elapsed Interaction

Using a standard protocol, billboard context and the activity run-time can be downloaded to a mobile device. Billboards games that are available as portable, independently executable formats can be downloaded. They can be stored with state and re-addressed. This allows for offline interactions.

Advertisements are also downloaded as a part of the activity (e.g., game.) The billboards are networked entities and their contents are visible like web pages. Similarly, users can interact with the billboards from their homes, offices, and cars, and from any location in the world.

In a preferred embodiment of the present invention, an individual user records his interest to a special item, and interacts with the special interest item on the billboard. Display of user interactions is confidential (i.e., from his actions a user identity cannot be defined.) For example, a user performs a search for some dress items in his cellular telephone via interaction with a billboard. These interactions that may include combining a dress with a user body can be shown on a billboard except that a user face is masked to hide the user's identity.

The interaction affects the content of the billboard item based on the user voting weight and/or on interest of user population on watching individual user interactions. Other synchronized billboards logical segments can be changed by using one or more of the following rules:

when users move from one billboard to others and their presence is detected by the billboards; and in a time interval when a content of a billboard logical section in one location is changed.

Figure 6:
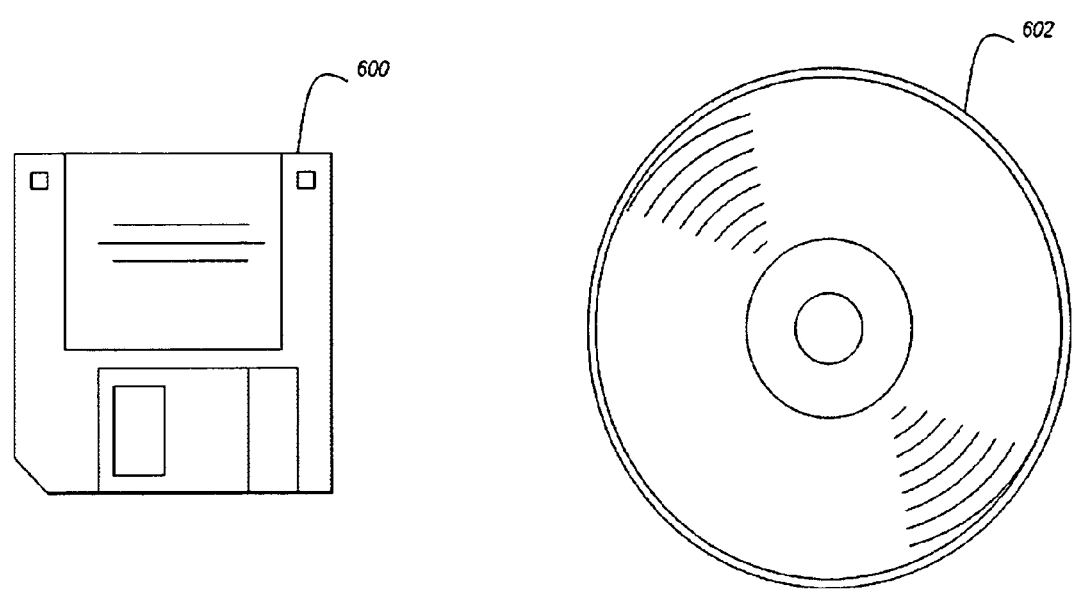
FIG. 6 illustrates a signal bearing medium 600 (e.g., storage medium) for storing steps of a program of a method according to the present invention.

FIG. 6 illustrates a signal bearing medium 600 (e.g., storage medium) and CD ROM 602 for storing steps of a program of a method according to the present invention.

Figure 7:
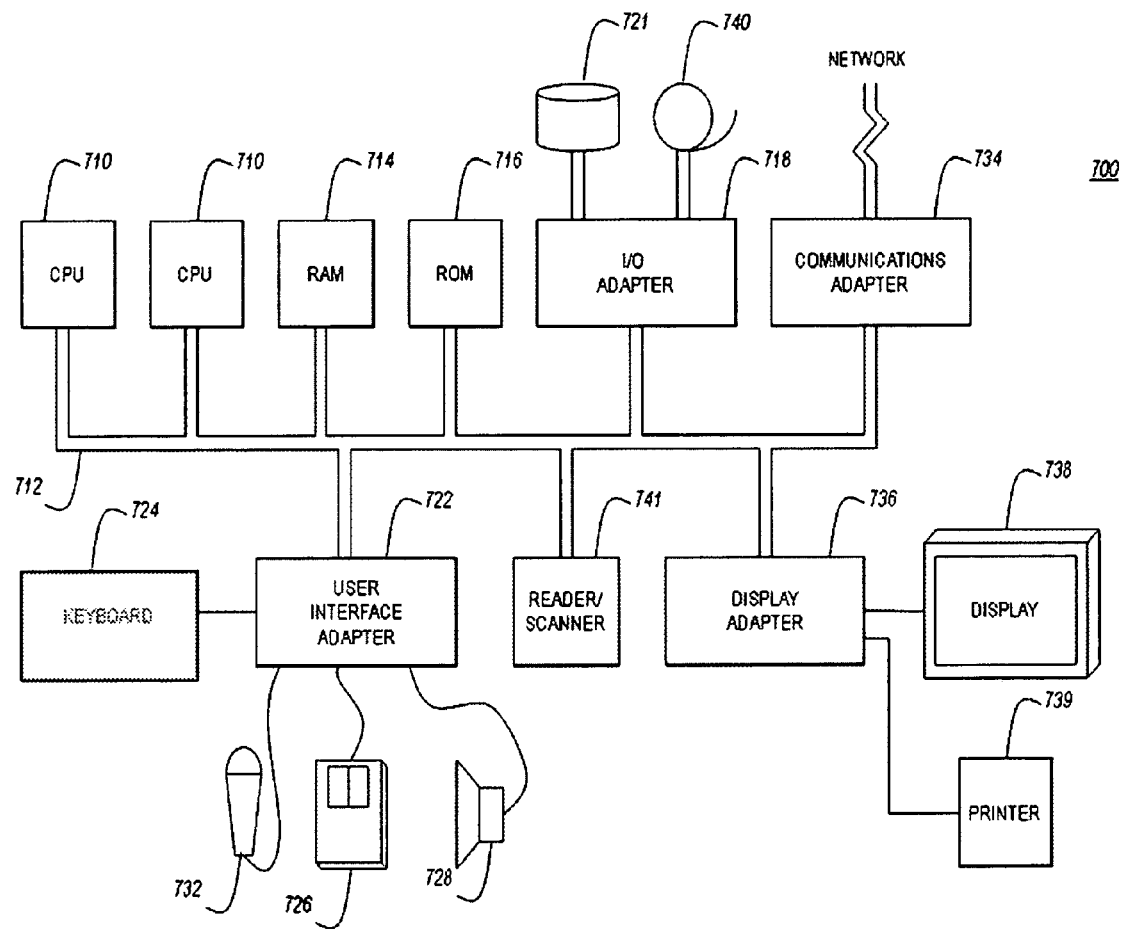
FIG. 7 illustrates an exemplary hardware/information handling system 700 for incorporating the present invention therein.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., reader/scanner 741, and a display adapter 736 for connecting the bus 712 to a display device 738 and/or printer 740.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing storage media.

This signal bearing storage media may include, for example, a RAM contained within the CPU 711, as represented by the fast access storage for example. Alternatively, the instructions may be contained in another signal bearing media, such as a magnetic data storage diskette 600 (FIG. 6), directly or indirectly accessible by the CPU 711.

Whether contained in the diskette 600, the computer/CPU 711, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

It should be noted that other objects, features, and aspects of the present invention will become apparent in the entire disclosure. Modifications may be done without departing from the gist and scope of the present invention as disclosed herein and claimed as appended herewith.

In addition, it should be noted that any combination of the disclosed and/or claimed elements, matters and/or items may fall under the modifications aforementioned.

What is claimed is:

1. A method of collaborative interactions with billboards, said method comprising:

receiving a request, by a billboard network manager, from an advertisement company to display synchronized interactive advertisements and video games on billboards in an area;

inviting users in the area to participate in the advertisements and video games through the billboards and mobile devices of the users via a network;

checking registration of the users to participate in the collaborative interactions with billboards, wherein if the users are not registered for participation, then the billboard network manager registers the users;

checking a volume of the users in the area for appropriate synchronized advertisements and video games, wherein if the volume of users is appropriate for the synchronized advertisements and video games, then the billboard network manager displays the synchronized advertisements and video games, and continues to track the volume of the users in the area, wherein if the volume of users is not appropriate for the synchronized advertisements and video games, then the billboard network management reconfigures synchronized billboard content for more appropriate advertisements and video games, wherein said reconfiguration of synchronized billboard content is performed by one of randomly changing a content, and propagating and extending through synchronized billboards a particular content of a billboard section that has high interest for the users, wherein said interest from the users is defined by reading biometrics of the users, and wherein said randomly changing the content is performed by choosing a new content from an advertisement and video games database.

* * * * *